United States Patent [19]

Kendall et al.

[11] 4,113,837
[45] Sep. 12, 1978

[54] PROCESS FOR SEPARATING POLYMERIC CONTAMINANTS FROM AQUEOUS ABSORBENT SOLUTIONS USED TO TREAT ORGANIC GAS-CONTAINING GAS STREAMS

[75] Inventors: John Edward Kendall, Charleston, W. Va.; Kenneth Francis Butwell, Newburgh, N.Y.

[73] Assignee: Union Carbide Corporation, New York, N.Y.

[21] Appl. No.: 836,542

[22] Filed: Sep. 26, 1977

[51] Int. Cl.$^2$ ............................................. B01D 53/34
[52] U.S. Cl. .................... 423/226; 423/228; 423/229; 423/232; 423/234; 423/242; 423/243; 260/677 A; 260/679 A; 260/683 R; 210/42 R
[58] Field of Search ............... 423/210, 226, 228, 229, 423/232, 233, 234, 243, 242, 220; 260/677 A, 679 A, 683 R; 210/42 R

[56] References Cited

U.S. PATENT DOCUMENTS

| | | | |
|---|---|---|---|
| 2,497,954 | 2/1950 | McCulley | 423/229 |
| 3,598,881 | 10/1968 | Kniel et al. | 260/683 |
| 3,660,016 | 5/1972 | John et al. | 423/226 |
| 3,696,162 | 10/1972 | Kniel | 260/677 A |
| 3,911,082 | 10/1975 | Rottmayer et al. | 423/226 |
| 3,926,591 | 12/1975 | Wildmoser et al. | 423/229 X |

Primary Examiner—Earl C. Thomas
Attorney, Agent, or Firm—Marylin Klosty

[57] ABSTRACT

Novel process for removing polymer from aqueous absorbent solutions used to contact organic gas-containing gas streams comprising the steps of adjusting the polymer-containing aqueous absorbent solutions to a pH of not more than about 8.5, preferably not more than about 7.5, for example, about 6.0 to about 8.5, preferably about 7.0 to about 7.5, and removing the polymer from the resulting solutions by decantation and/or filtration. The novel process is particularly applicable to the system of removing acid gas from hydrocarbon-containing feed gases which contain one or more polymerizable components wherein the feed gas is contacted with an aqueous absorbent solution which absorbs the acid gas and, thereafter, the absorbent solution is stripped to rid it of said acid gas. The adjustment of pH can be accomplished by increasing the acid gas loading in the aqueous absorbent or by adding an acid, preferably one which will not form a heat stable salt with the absorbent. The pH adjustment, e.g., acidification, and filtration can be performed on the total mainstream or a portion thereof, i.e., a sidestream, before it is stripped.

26 Claims, 3 Drawing Figures

PROCESS FOR SEPARATING POLYMERIC CONTAMINANTS FROM AQUEOUS ABSORBENT SOLUTIONS USED TO TREAT ORGANIC GAS-CONTAINING GAS STREAMS

BACKGROUND OF THE INVENTION

1. Field Of The Invention

This invention relates to the removal of polymeric contaminants from aqueous absorbent processing solutions to reduce or prevent fouling of process apparatus and/or loss of absorbent in said processing solutions. In particular, the invention relates to the treatment of aqueous absorbent solutions used to contact organic gas-containing gas streams and has as a principal purpose the removal of contaminants and fouling materials. This invention more specifically relates to novel processes for removing acid gas from hydrocarbon-containing gases containing said acid gas and one or more polymerizable components and is applicable to the removal of acid gases from downstream effluents derived from the cracking of crude oil or its fractions ($C_5$ and higher); the cracking of normally gaseous hydrocarbons ($C_1$ to $C_4$) including liquefied petroleum gas; the cracking of the individual constituents of crude oil, its fractions and/or the normally gaseous hydrocarbons mentioned above or mixtures of said constituents; and gaseous effluents from coal. The invention more particularly relates to the removal of polymeric materials which form from said polymerizable component in systems utilized for removing acid gas and which tend to foul the process apparatus used, especially reboilers, heat exchangers and other similar apparatus.

2. Description Of The Prior Art

The problems of polymer formation in systems used to remove acid gas from feed gases are well known in the prior art.

As an illustration, two compounds that must be removed in the separation train of an olefins unit are the acid gases $H_2S$ and $CO_2$. In a conventional plant, the cracked gas can contain 800 to 1200 ppm $CO_2$ resulting from the high temperature interaction of hydrocarbons with dilution steam and 20 ppm or less $H_2S$. The $H_2S$ results from the injection of sulfur compounds to suppress the catalysis of water-gas reactions by furnace tube walls or decomposition of sulfur compounds in the feedstock. Acid gases are usually removed from the cracked gas in one of several ways. The acid-gas removal unit can be placed at the front of the separation train or at the end if the columns are operated to send the acid gases with ethylene. In the former case, the acid gases can be removed by contacting the cracked gas with dilute caustic. In the latter case, the acid gases can be separated from ethylene by absorption in an alkanolamine or other regenerative aqueous absorbent in a column at the end of the train. If mercaptans are present in the cracked gas, acid gas removal must be carried out at the front of the separation train or sulfur removal will be required in the $C_2$ through $C_5$ product streams which is more difficult, more costly and less effective. Alkanolamine or other regenerative aqueous absorbent units are not normally placed at the front of the separation train because of the formation of sulfur-containing diolefin polymers that rapidly foul heat exchange sufaces which are normally used in such units to conserve energy and regenerate the absorbent.

The reactive compounds (styrene, isoprene, butadiene, cyclopentadiene, etc.) present in a cracked gas stream dictate that any acid-gas removal system operating in front of the separation train will have a polymer formation problem to contend with. Polymer is produced even in caustic systems used for removal of acid gas. However, continual purging and lack of the need for heat exchange surfaces allow caustic systems to operate successfully. Caustic systems of the type used hereinbefore are not regenerative and thus are costly to operate. Caustic systems heretofore used also generate large quantities of waste caustic solution which presents a significant disposal problem. A regenerative aqueous absorbent acid-gas system will operate successfully only if polymer is removed from the system as it forms. Fouling that results from the introduction of polymer into heat exchangers can be prevented by removing polymer as it is formed.

Many diverse attempts have been made to overcome the problems of polymer formation as described above. Illustratively, U.S. Pat. Nos. 3,598,881; 3,696,162; 3,911,082 and 3,926,591 are directed to correcting the problem of polymer formation by the use of hydrocarbon solvents to selectively extract from the feed gas the polymerizable component that causes the polymer problem.

U.S. Pat. No. 1,956,113 is not concerned with polymer formation and describes a technique for reducing thiosulfate salts with hydrogen sulfide in gas absorption systems to precipitate sulfur followed by the removal of the precipitated sulfur by filtration. This patent is not at all concerned with a polymer fouling problem or the treatment of an absorbent solution loaded with acid gas.

Similarly, U.S. Pat. No. 3,139,324 also does not concern itself with a polymer fouling problem and is directed to a technique for preventing frothing when water is used under high pressure to remove acid gases from gas mixtures. In this patent a small amount of an alkanolamine having no nitrogen-bonded hydrogen and a small amount of a polybasic mineral acid are added to the water.

U.S. Pat. No. 1,944,122 describes a method for controlling foaming in a gas scrubbing operation involving the use of activated carbon and vegetable oil and does not address itself to a polymer fouling problem.

U.S. Pat. No. 3,535,263 teaches the addition of particular types of polyhydroxycarboxylic acids to aqueous ethanolamine solutions to forestall degradation of the ethanolamine but is not concerned with a polymer fouling problem.

U.S. Pat. No. 3,808,140 has the object of avoiding corrosion by adding combinations of antimony and vanadium compounds to aqueous alkanolamine solutions but does not refer to a polymer fouling problem.

None of the above-mentioned patents disclose, teach or suggest the method of avoiding a polymer fouling problem by adjusting the pH of a regenerable aqueous absorbent solution loaded with an acid gas to not more than about 8.5 using an acid or acid-forming material and then filtering the resulting solution to remove polymer in the solution.

SUMMARY OF THE INVENTION

The present invention provides for the reduction or prevention of fouling of process equipment by polymer formed in aqueous absorbent solutions used to treat organic gas-containing gas streams which also contain polymerizable components capable of forming polymers under the conditions to which the absorbent solution is subjected. The invention permits the use of a regenerative aqueous absorbent system for removing acid gases at the front of a separation train used to separate organic components from an organic gas-containing gas stream. More specifically, the invention is especially useful in systems in which a regenerative aqueous absorbent solution is contacted with an organic gas-containing gas stream or feed gas for the purpose of removing acid gas, such as $CO_2$ and/or $H_2S$, prior to further processing of the gas stream. In such cases the gas stream or feed gas is contacted in an absorbing zone with an aqueous absorbent solution containing as an absorbent an alkanolamine, an alkali metal carbonate, an alkali metal aminoalkanoate, ammonium carbonate or ammonium hydroxide to remove the acid gas from the feed gas and form a mainstream of rich aqueous absorbent solution enriched in acid gas removed from the feed gas. The rick aqueous absorbent solution is then moved to a stripping zone where the acid gas contained therein is removed to form a lean aqueous absorbent solution depleted in acid gas content. Thereafter, the lean aqueous absorbent solution is recycled and re-contacted with succeeding feed gas containing acid gas.

In one aspect of this invention the feed gas comprises effluents derived from the cracking of crude oil or its fractions ($C_5$ and higher). In other aspects, the feed gas is derived from the cracking of normally gaseous hydrocarbons ($C_1$ to $C_4$) including liquefied petroleum gas (LPG) or the cracking of the individual constituents of crude oil, its fractions and/or the normally gaseous hydrocarbons mentioned above or mixtures of said constituents. The feed gas can also be derived from the gasification of coal and can comprise any gaseous effluent containing a polymerizable component in addition to the acid gases to be removed. The invention more particularly relates to the removal of polymeric materials which form from said polymerizable component in systems utilized for removing acid gas and which tend to foul the process apparatus used, especially reboilers, heat exchangers and other similar apparatus.

The precise nature of the polymeric contaminant or fouling material formed in systems of this type is unknown. Analyses indicate that in some instances the polymer is almost wholly organic and in other instances it contains very high amounts of sulfur, e.g., 70 to 80 wt.% or more. Dripolene fractions in the feed gas have been found to be potent polymer formers while other olefinic components form polymers at a slower rate. The presence of sulfur (combined or not) in the feed gas also promotes polymer formation and imparts some solubility to the polymer in the regenerative aqueous absorbent enabling the polymer to travel to other parts of the system, for example, heat exchangers, where fouling can occur.

This invention is based on the discovery that the polymeric contaminant formed in regenerative acid-gas removal systems of the type described herein can be removed as it is formed by adjusting the pH of the regenerative aqueous absorbent solution to not more than about 8.5, for example, into the range of about 6.0 to about 8.5, preferably about 7.0 to about 7.5, and decanting and/or filtering the solution to remove the polymer. In its preferred form the invention uses one or more decanters and carbon filters for removing the polymer. Any suitable type of filter carbon or its equivalent can be used including activated carbon. The form of the carbon depends upon the design characteristics of the system in which it is to be used. In most cases, particulate carbon having a particle size of about 4 mesh to about 80 mesh will be suitable. As examples of commercially available activated carbon are a 12 to 40 mesh carbon sold under the name Nuchar by Westvaco and an 8 to 20 mesh carbon sold by Perry Gas Inc., Odessa, Texas. The lowered pH has been found to render the polymer less soluble and to enhance the ability of the filter to adsorb and remove the polymeric contaminant.

In the operation of a regenerative aqueous absorbent system for removing acid gas from the feed gases, the regenerative aqueous absorbent solution is brought into contact with the feed gas in an absorber from which a rich aqueous absorbent solution, enriched in acid gas removed from the feed gas, is removed. The rich aqueous absorbent solution has a pH normally ranging from about 9.0 to about 10.0 or higher and is sent to a stripper where most of the acid gas content is driven off producing a lean aqueous absorbent solution having a pH normally ranging from about 9.0 to about 11.0 or higher. The lean aqueous absorbent solution is returned to the top of the absorber for recontent with incoming feed gas. Heat energy is conserved by passing the rich and lean aqueous absorbent solutions through a heat exchanger where heat is exchanged between the lean and rich solutions. In a preferred form of this invention, the pH of the rich aqueous absorbent solution is adjusted to about 6.0 to about 8.5, preferably about 7.0 to about 7.5, passed through a decanter, and contacted with the carbon filter before it enters the stripper. The advantages of this invention are further enhanced by passing the rich aqueous absorbent solution into a decanter where light and heavy insoluble fractions are removed before the solution contacts the carbon filter.

The pH lowering of the rich aqueous absorbent solution pursuant to this invention can be accomplished in any suitable way. A suitable acid or acid-forming material can be added to and mixed with the mainstream of the solution before it contacts the carbon filter or a sidestream can be taken from the mainstream of the solution and the acid or acid-forming material added to and mixed with the sidestream. In the latter case, the sidestream can constitute about 1.0 to about 20% or more of the total mainstream, i.e., the total mainstream before the sidestream is separated. Suitable acids or acid-forming materials include $CO_2$, $H_2S$, $CH_3SH$, HCl and the like. It is preferred to use a weak acid or weak acid-forming material that is incapable of reacting with the absorbent of the aqueous absorbent solution to form a thermally stable compound with said absorbent. Thus, $CO_2$, $H_2S$, and $CH_3SH$ are examples of preferred acids or acid-forming materials. The acid gas, comprising mainly $CO_2$ with some $H_2S$, removed in the stripper represents a readily available supply of acid-forming materials.

For example, in one preferred form of this invention, a sidestream of rich aqueous absorbent solution is treated with acid gas released by the stripper to lower the solution's pH to the desired level. The solution is then returned to the mainstream of aqueous absorbent solution before it enters the carbon bed. The sidestream after acidification can be passed through a sidestream carbon bed to remove polymer from the acidified sidestream before it rejoins the mainstream. Also, the sidestream can be passed through a sidestream decanter to remove heavy insoluble materials including insoluble polymer before the sidestream enters the sidestream carbon bed or rejoins the mainstream.

Another ready source of acid or acid-forming material is the acid gas in the feed gas entering the absorber.

In another preferred form of this invention, which in some cases is a most preferred form, the acid gas loading in the rich aqueous absorbent solution leaving the absorber is increased to a level of at least about 0.6, preferably about 0.65 to about 0.75 mol of acid gas per mol of absorbent in the aqueous solution. This can be achieved by the skilled worker by constructing and/or operating the absorber in any manner that provides such high acid gas loadings. For example, a two stage absorber can be used with provision for cooling the enriched aqueous absorbent solution after it leaves the bottom of the second stage and before it enters the top of the first stage.

It is to be noted that the pH of the rich aqueous absorbent solution to be contacted with the carbon filter can be lower than that specified above, i.e., less than 6.0, and can be as low as 2 or 3, and/or the acid gas loading can be higher than 0.75 mol acid gas per mol of absorbent except for corrosion problems which may be presented by the more highly acidic conditions. If the system is capable of withstanding such more highly acidic conditions without danger from corrosion of its components then, as noted, pH's lower than 6.5, i.e., as low as 2, and/or acid gas loadings of greater than 0.75 mol acid gas per mol of absorbent can be used.

The absorbent used in the aqueous absorbent solution described herein is preferably an alkanolamine such as diethanolamine, monoethanolamine and others such as those listed in U.S. Pat. No. 3,904,735. Alternatively, the absorbent can be an ammonium hydroxide, an alkali metal carbonate, e.g., sodium or potassium carbonate, ammonium carbonate, or an alkali metal aminoalkanoate, e.g., the potassium salt of methylaminopropionic acid. Any other absorbent that acts in an equivalent way in the systems described herein can be used. The aqueous solution can contain from about 5 to about 50 wt. % of the absorbent, preferably about 10 to about 40 wt. %. Higher or lower amounts can be used, if desired.

Representative operating conditions which can be used in the processes of this invention are given below. These conditions are illustrative and not limiting. Conditions outside of the ranges given below can also be industrially practical. The specific conditions used are largely dependent upon the composition of the feed gas to be treated and the size and type of equipment available or in use in acid gas units to which this invention is applied and will be readily apparent to the skilled worker. The absorber can be operated with a temperature of about 10° to about 60° C. at the top and about 10° to about 70° C. at the bottom. The temperature of the feed gas fed to the absorber can range from about 10° to about 60° C. The lean aqueous absorbent solution can be fed to the top of the absorber at a temperature of about 10° to about 60° C. and withdrawn from the bottom at a temperature of about 10° to about 70° C. When a two stage absorber is used the feed gas having a temperature in the above-specified range can be fed to the bottom of the first stage having a bottom temperature of about 40° to about 60° C. and a top temperature of about 10° to about 50° C. The lean aqueous absorbent solution enters the top of the second stage at a temperature in the range specified above and exits the bottom at a temperature of about 40° to about 80° C. The top temperature of the second stage can be about 10° to about 55° C. and the bottom temperature can be about 40° to about 80° C. Before entering the top of the absorber first stage the aqueous absorbent solution is cooled to a temperature in the range of about 10° to about 50° C.

The absorber pressure can be maintained at about 100 to about 600 psig. The circulation rate of aqueous absorbent solution in the system is dependent upon the desired acid-gas loading and the feed gas rate. The mainstream and sidestream decanters, if used, can be operated at a pressure of about 50 to about 550 psig. The stripper can be operated at a pressure of about 0 to about 20 psig and a top temperature of about 90° to about 100° C. and a bottom temperature of about 110° to about 130° C. The mainstream carbon bed and sidestream carbon bed, if used, can be operated at a pressure of about 50 to about 550 psig. The sidestream acidifier, if used, utilizing acid gas can be operated at a pressure of about 50 to 600 psig with a top temperature of about 10° to about 50° C. and a bottom temperature of about 30° to about 80° C. The amount of acid gas circulated from the top of the stripper to the bottom of the acidifier, if used, can be about 5.0 to about 100% of the total amount of total volume of acid gas coming off the stripper.

There are many variations of the steps of the process described above which do not change the essential nature of the invention described and claimed herein.

DESCRIPTION OF SPECIFIC EMBODIMENTS

The following examples are presented. In the examples, the following designations have the meanings given below:

| | |
|---|---|
| cc | cubic centimeter |
| g or gm | grams |
| mg or mgm | milligram |
| wt. % | weight percent |
| ppm | parts per million based on weight |
| ppmv | parts per million based on volume |
| ml | milliliter |
| psia | pounds per square inch absolute |
| psig | pounds per square inch gauge |
| DEA | diethanolamine |
| MEA | monoethanolamine |
| polymer | any polymeric structure of organic or inorganic composition of high or low molecular weight formed in the system |
| polymer content | mg of polymer per gram of aqueous absorbent in said solution |
| Gardner Color Value | value determined by comparing the color of the test solution with the color of a standard color wheel. A value of 1 is a very light color, if not almost clear, and a value of 18 is very dark or essentially black. Intermediate values going from 1 to 18 designate gradations of clear to yellow to brown to black. |

The polymer content of a solution cannot be accurately predicted from the Gardner color. However, the polymer concentration and solution color tend to increase or decrease together. A Gardner color of 14 to 15 probably represents a limit for operability. This color corresponds to a polymer concentration of about 0.06 to 0.1 wt. % (about 0.6 to 1 mg/g). Deposits occur on heat exchange surfaces and some operating problems may be encountered after 1 to 2 months of operation in this color range. If the solution's Gardner color is maintained between 12 and 14, however, the polymer concentration should run from about 0.01 to 0.08 wt. % (about 0.1 to 0.8 mg/g) and fouling should not cause any operating problems for at least 3 to 6 months. If the solution's Gardner color can be maintained below 12, fouling should not be a significant problem. Also, unless otherwise specified, all parts and percentages are on a weight basis, and all temperatures are on the Centigrade scale.

Examples 1, 2 and A–E

Figure 1:
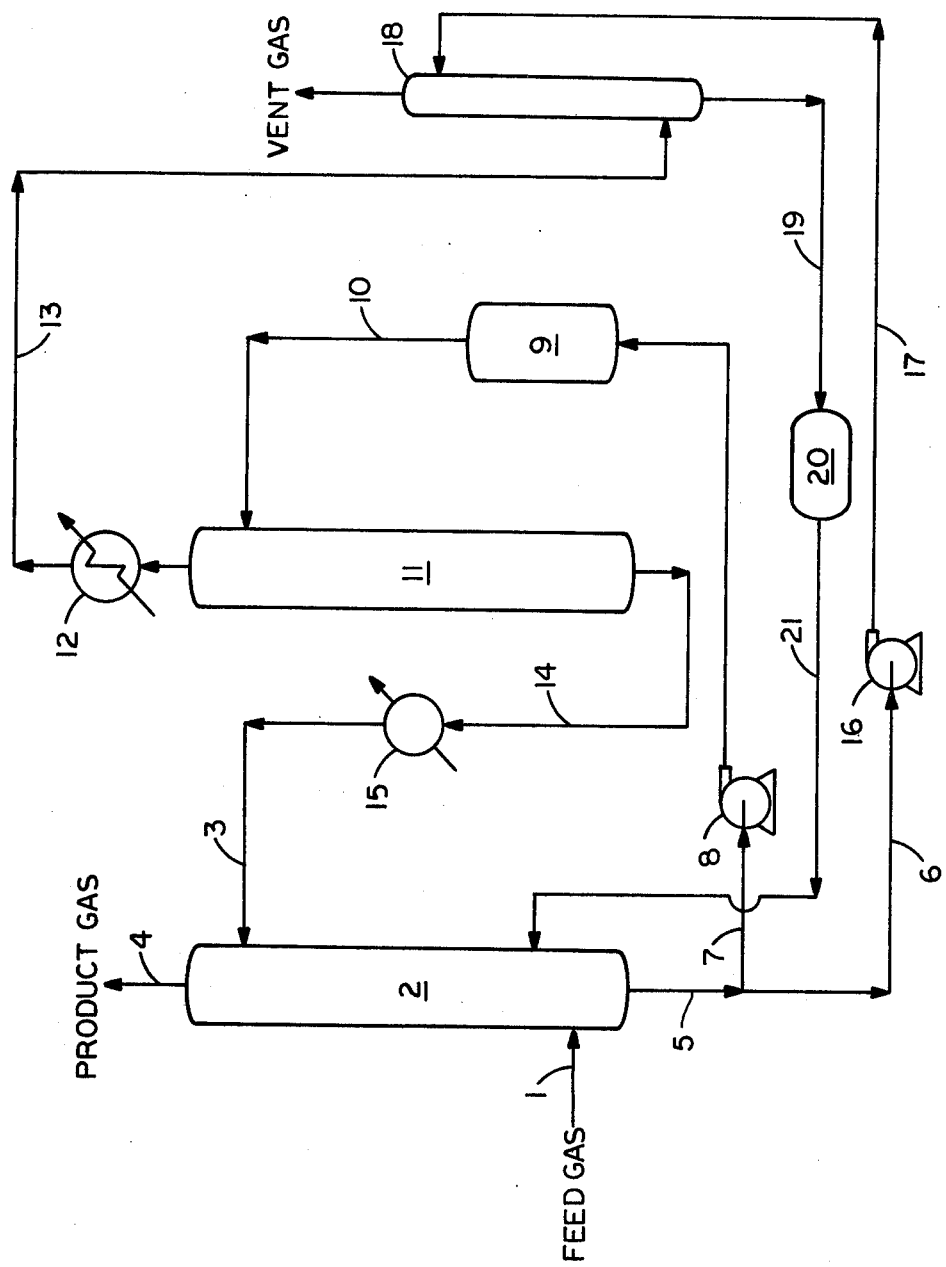
FIG. 1 is a flow diagram illustrating one embodiment of this invention wherein a sidestream acidifier and carbon filter bed are used and the sidestream thereafter is returned to the absorber.

FIG. 1 illustrates the process of this invention as applied to a simulated cracked gas stream as the feed gas. The analysis of the feed gas is given in Table I below.

TABLE I

| FEED GAS ANALYSIS | |
|---|---|
| Component | Volume Percent |
| Hydrogen Sulfide | 0.18 |
| Hydrogen | 17.54 |
| Carbon Monoxide | 0.44 |
| Carbon Dioxide | 40.00 |
| Methane | 14.90 |
| Acetylene | 4.20 |
| Ethylene | 18.81 |
| Ethane | 0.56 |
| Methyl Acetylene | 0.85 |
| Propylene | 1.54 |
| 1,3-Butadiene | 0.86 |

Before further processing of the feed gas, it is desirable to remove the acid gas, i.e., the $H_2S$ and $CO_2$. This is performed by the process illustrated in FIG. 1 wherein the feed gas is fed through line 1 into absorber 2 wherein it is countercurrently contacted with an aqueous absorbent solution containing about 30 weight percent of DEA for Examples A, C, E and 1 or about 20 weight percent aqueous MEA solution for Examples B and D. In Example 2, there was used a fouled DEA solution which resulted from using a 30 wt. % aqueous DEA solution to absorb acid gas from a cracked gas produced in an industrial cracking plant and which was opaque, black and oily, indicating the presence of large amounts of polymers, entering the top of absorber 2 through line 3. In passing down through absorber 2, the aqueous absorbent absorbs $H_2S$ and $CO_2$ from the feed gas passing upwardly such that there is essentially no amounts of acid gas in the resulting product gas exiting from the top of the absorber through line 4. The aqueous absorbent loaded with acid gas exits the absorber 2 through line 5 at the bottom thereof and in Examples A–D it is totally passed directly to the top of stripper 11. In Example E it is totally passed through a carbon bed 9 (400 cc) and in Examples 1 and 2 it is split into two streams, a sidestream 6 and a mainstream 7. Mainstream pump 8 moves mainstream 7 of aqueous absorbent solution loaded with acid gas to carbon bed 9 (400 cc) and thence through line 10 to the top of stripper 11. The absorber 2 comprises an absorber kettle of 500 cc capacity to which is attached a 1.3 cm × 84 cm absorber column packed with glass rings. The stripper 11 comprises a stripper kettle of 500 cc capacity to which is attached a 2.5 cm × 84 cm stripper column packed with glass rings.

In stripper 11 the acid gas in the loaded absorbent solution is stripped and exits the stripper 11 from the top, passing through condenser 12 and thence through line 13. In Examples A–E the stripper acid gas is vented. In Examples 1 and 2 it is sent to an acidifier 18 as described hereinafter. Lean aqueous absorbent solution from which acid gas has been removed leaves the bottom of stripper 11 through line 14 and passes through cooler 15 and into the top of absorber 2 through line 3.

In Examples 1 and 2 the sidestream 6 of loaded aqueous absorbent solution is moved by pump 16 through line 17 into the top of acidifier 18. Acid gas removed from the loaded absorbent solution in stripper 11 is passed through line 13 into the bottom of the acidifier 18 where it contacts and acidifies the sidestream 6 of loaded aqueous absorbent solution which then passes through line 19 into a 100 cc carbon bed 20, after which it returns to absorber 2 through line 21. The acidifier 18 comprises an acidifier kettle of 125 cc capacity to which is connected a 1.3 cm × 84 cm acidifier column.

Each of these examples is carried out at atmospheric pressure and the aqueous absorbent solution is cycled through the system at the rate of 1.0 liter/hour for Examples A, E, 1 and 2 and 1.18 liters/hour for Examples B–D. The feed gas is fed through line 1 into absorber 2 at the rate of about 33 liters/hour. The absorber kettle of absorber 2 is maintained at a temperature of about 25° to 40° C. and the kettle of stripper 11 is maintained at a temperature of about 100° C. The proportion of aqueous absorbent solution passing as sidestream 6 through acidifier 18 amounts to 25 to 30 percent of the loaded absorbent solution exiting the bottom of absorber 2. The system is operated in a manner to remove about 90 percent or more of the acid gas from the entering feed gas 1. In order to simulate certain process conditions air is bubbled into the kettle of absorber 2 at the rate of 30 bubbles (of about 3 mm diameter) per minute. In order to accelerate polymer formation and simulate usual process conditions wherein a cracked gas contains dripolene fractions, a dripolene fraction is injected into the kettle of absorber 2 at the rates given below for each example. The dripolene fraction is the resulting fraction after distilling dripolene under vacuum at a temperature below 100° C. and contains about 74 wt.% aromatics such as benzene, toluene, the xylenes, styrene, ethylbenzene, indene, vinyltoluenes, ethyltoluenes, naphthalene and other substituted and unsubstituted aromatic compounds; about 9 wt.% of cyclic olefins including cyclopentene and methyl substituted cyclopentenes, 1,3-cyclopentadiene and methyl substituted 1,3-cyclopentadienes, cyclohexene, and dicyclopentadiene and methyl derivatives thereof; about 5 wt.% of normal $C_4$ to $C_{12}$ alkanes; about 4 wt.% of branched alkanes such as methyl substituted $C_4$ to $C_8$ alkanes; about 3 wt.% of cyclic alkanes such as cyclohexane and methyl and ethyl substituted cyclohexanes, and methyl substituted cyclopentanes; about 1 wt.% normal $C_4$ to $C_8$ olefines, e.g., butadiene, pentadienes, pentenes, hexadiene, and octene and about 0.7 wt.% branched olefins such as isoprene and methyl substituted butene. The carbon beds 9 and 20 employed two types of carbon, namely 12 to 40 mesh carbon sold under the name of Nuchar by Westvaco and 8 to 20 mesh carbon from Perry Gas Inc., Odessa, Texas.

The process conditions and results for each Example are summarized in Table II below.

TABLE II

| Example No. | Absorbent | Carbon Bed Used | Acidifier Used | % Absorbent in Sidestream* | Length of Run | Dripolene Added | Final Solution Gardner Color | Polymer in System |
|---|---|---|---|---|---|---|---|---|
| A | DEA (30 wt.%) | No | No | 0 | 6 days | last 24 hrs | 7 | No |
| B | MEA (20 wt.%) | No | No | 0 | 7 days | last 3 days | 12 | No |
| C | DEA (30 wt.%) | No | No | 0 | 7 days | 10 cc/day | 15–17 | Yes |
| D | MEA (20 wt.%) | No | No | 0 | 7 days | 10 cc/day | 15–17 | Yes |
| 1 | DEA (30 wt.%) | Yes | Yes | 25–30 | 22 days | 10 cc/day | 4.5 | No |
| E | DEA (30 wt.%) | Yes | No | 0 | 38 days | 10 cc/day | 11 | Yes |
| 2 | Fouled DEA solution | Yes | Yes | 25 | 1 day | No | 6 | No |

*Sidestream 6 as a percentage of stream 5.

In Example A, immediately after startup, the absorber kettle solution became light green and the stripper kettle solution very faint green. Both solutions remained unchanged for 5 days indicating no polymer formation over the relatively short duration of the run. The green color is believed to result from $H_2S$ absorption plug iron contamination. To determine whether the lack of polymer formation was related to the absence of dripolene fraction in the feed gas, ten cubic centimeters of the dripolene fraction as described above were injected into the absorber kettle. In 2.5 hours both the absorber solution and the stripper solution had become golden and in 24 hours both solutions had become red orange (Gardner color of 7).

In Example B, initially, the solutions in both absorber and stripper kettle were light orange. After running for 10 minutes the absorber kettle had become very black from the formation of a black precipitate, iron sulfide. Formation of the precipitate ceased with depletion of iron salts in the system and the solution cleared as the precipitate settled. As in the previous Example A, the solution remained a light green for four days indicating no polymer formation over the relatively short duration of the run. Ten cc of dripolene were then added to the absorber 2 and the run was continued for three more days. Then an additional 10 cc of dripolene were added to the absorber 2 and the run continued for an additional 7 hours before terminating. The solution's color had degraded to a light brown (Gardner color of 12).

In Examples C and D, the color of the solutions in both systems steadily deteriorated reaching a Gardner color of 15–17. The MEA solution of Example D was about one Gardner number lighter than the DEA solution of Example C. The DEA system of Example C contained a small quantity (<1 gm) of a light-brown polymer in the absorber kettle and the MEA system contained about the same quantity of material in each kettle. Solutions from the two systems were acidified with concentrated HCl to precipitate the soluble polymer present. The DEA solution produced 2.59 milligrams of polymer per gram of solution and the MEA solution produced 0.62 milligrams polymer per gram solution. After correcting analyses of the two precipitates for MEA or DEA content, the DEA solution was found to possess roughly three times as much polymer as the MEA solution and about twice as much sulfur. Polymer from the DEA absorber was two-thirds inorganic, 20 percent DEA, and 14 percent true polymer. The MEA absorber polymer was one-third true polymer, one-third MEA and one-third a silicone compound (from stopcock grease and etching of glassware). MEA stripper polymer was about three-forths true polymer, 18 percent MEA, and less than 10 percent silicate. Thus the DEA system apparently produced more soluble polymer than the MEA system but the MEA system produced a greater quantity of insoluble residues particularly in the stripper.

In Example 1 after 20 days, the DEA solution in the system remained clear and light yellow. Two-tenths percent diacetylene was then added to the feed gas and the run continued two more days. The presence of diacetylene in the feed gas produced no observable effect. Diacetylene passed through the absorber without reacting and the solution's color remained unchanged. At the end of the run (22 days), the solution had a Gardner color of 4.5. The carbon bed was removed from the system and the carbon separated into two portions. One portion was washed in benzene to displace any absorbed species and the other portion was heated in boiling water in an attempt to steam strip the carbon. The benzene wash and the organic layer obtained by steam stripping were analyzed and appeared to be of dripolene origin. This Example illustrates the capability of the process of this invention of maintaining the absorbent solution polymer-free over relatively long periods of operation.

In Example E, the unit was operated with the carbon bed 9 but without the acidifier 18. The run lasted a total of 38 days and the solution's color varied between light yellow and orange. Apparently, heavy dripolene fractions became trapped in the carbon bed and periodically broke free and entered the stripper 11. At these times the solution would darken and then return in several hours to its light yellow condition. By wetting the carbon's surface, the heavy dripolene fraction became trapped in the carbon bed. When the solution became periodically discolored when the dripolene fraction broke through the carbon bed, the carbon bed slowly removed the polymer responsible for the color and thus returned the solution to its original condition. On the 38th day, gas was pumped through the bed because of a system upset. Trapped dripolene fraction broke free and entered the stripper 11. The DEA solution became discolored rapidly and a lump of dark brown viscous polymer developed in the stripper kettle. The run was continued several more hours and then terminated. The solution had a Gardner color of 11. On cooling, the polymer became hard and glassy. Analysis of the polymer indicated the presence of long chain alkyl benzene compounds with possible trans unsaturation. Silicon compounds (stopcock grease) were also noted. The presence of $COO^-$ groups and C—O—H groups coupled with a nitrogen content of 3 percent indicates the presence of DEA in the polymer. The major component was dripolene polymer (42 percent) with DEA (33 percent) and a silicon compound comprising a significant but smaller portion. This Example indicates the effectiveness of the carbon bed 9 without the acidifier in removing the polymer formed in the system. However, periodically, polymer or polymer-forming materials break through the carbon bed without the acidifier to reach other parts of the system to provide the danger of fouling and cause a reduction in the effectiveness of the absorbent by reacting with it.

In Example 2, a charge of 814 grams of the fouled DEA solution was placed in the unit shown in FIG. 1. The solution was cycled at a rate of 1000 cc/hr with a 25 percent sidestream 6 flow through the acidifier 18. The solution was contacted in the absorber with the same feed gas used in the previous Examples and the acidifier 18 was operated with stripper vent gas. Dripolene was not added to the absorber 2. In 24 hours the solution improved from its opaque black oily condition to a Gardner color of 6 (a light yellow-green), although no change in color was noted after the first 5 hours. The carbon bed was removed from the unit and broken into 1-inch sections across the bed. Some of the sections were then analyzed for sulfur distribution across the bed as an estimate of the polymer distribution across the bed in the direction of flow. The results shown in Table III below show that polymer was removed by the bed and suggest that the mass transfer front is relatively long (1.5 to 2 feet) and that some channeling may have occurred in the bed.

TABLE III

| Section Of Bed In Direction Of Flow | Wt. %. Sulfur |
|---|---|
| 1st inch | 1.98 |
| 2nd inch | 1.69 |
| 6th inch | 1.31 |
| 7th inch | 1.16 |
| 8th inch | 1.28 |
| 9th inch | 0.99 |
| 10th inch | 1.78 |

Examples 3, 4 and F

These Examples demonstrate the effect of pH on carbon's ability to remove polymer from fouled DEA solutions and the effect of having $H_2S$ in the acidifying gas. In all three Examples, fouled DEA solution described in Examples 1, 2 and A–E was cycled through a 62 cc bed of 8–20 mesh activated carbon. The fouled DEA solution's pH was 9.6 and its polymer content (75 wt.% of which was sulfur) as determined by HCl precipitation was 7 milligrams per gram of fouled DEA solution.

In Example F, the fouled DEA solution was cycled through the carbon bed without acidifying. The run lasted 24 hours during which the solution's pH did not change. The solution's Gardner color dropped from 18+ to 9 and its polymer content dropped to 0.974 milligram per gram of solution (62 percent as sulfur).

In Example 3, the fouled DEA solution's pH was maintained at 7.5 by sparging with $CO_2$ while it was cycled through the carbon bed. In 24 hours, the solution's Gardner color was reduced from 18+ to 2 and the polymer concentration was reduced to nil.

In Example 4, the fouled DEA solution's pH was adjusted by sparging with a gas mixture of 5 volume percent $H_2S$ in $CO_2$. The solution's pH dropped to 7.8. The solution was cycled through the carbon bed for only 6 hours. However, the Gardner color dropped to 7 and the polymer concentration decreased to 0.32 milligrams per gram of solution (61.4 percent as sulfur).

On standing the acidified and carbon treated solutions of Examples 3 and 4 developed a white to gray precipitate. Preliminary analysis indicates that the precipitate is a DEA salt containing aluminum, calcium and silicon with, however, very little sulfur present. These Examples demonstrate that clarification of fouled DEA solutions by carbon treatment can be considerably enhanced by reducing the solution's pH below 8 and preferably to 7.5 or below. The same conclusions apply when $H_2S$ is present in the acidifying gas.

Examples 5–7, G and H

Figure 2:
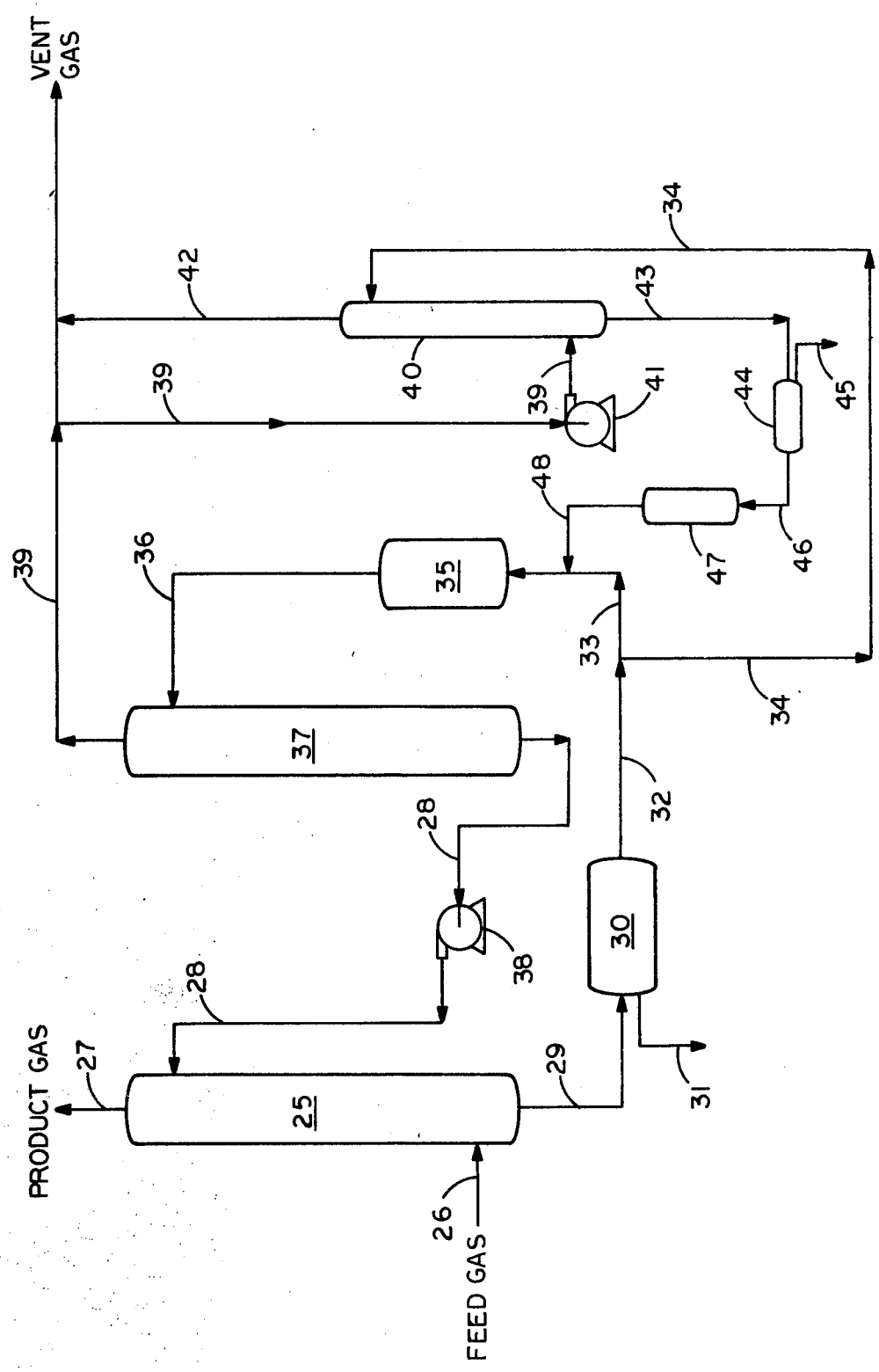
FIG. 2 is a flow diagram illustrating another embodiment of the invention wherein a sidestream acidifier and carbon filter bed are utilized and the sidestream thereafter is returned to the mainstream before it enters the stripper.

Referring to FIG. 2, there is shown diagrammatically a system for carrying out the process of this invention using a sidestream acidifier, carbon beds and decanters. In this embodiment the feed gas, e.g., cracked gas having a temperature of about 35° to about 40° C. is fed into an absorber 25, containing about 4.5 feet of ¼ inch stainless steel protruded packing, through pipe 26 and passes upwardly therethrough and exits as product gas through outlet 27. The temperature in the bottom of the absorber column 25 is about 70° C. and the temperature in the top is about 40° C. The pressure in the absorber 25 is about 300 psig. Lean aqueous DEA (or MEA in Example 6) solution containing about 30 wt.% DEA, depleted in acid gas and having a temperature of about 40° C., enters the top of the absorber 25 through line 28 and rich aqueous DEA solution (rich in acid gas) containing 0.5 mol acid gas/mol of DEA is moved out of the bottom of absorber 25 through line 29 and into a decanter 30 where light insoluble hydrocarbons and other materials are separated and removed through a vent (not shown) and where heavy insoluble polymers are separated and removed through line 31. The temperature of solution in the decanter is about 40° C.

From the decanter 30, the rich DEA solution passes through line 32 and is split into a mainstream 33 and a sidestream 34. The size of the sidestream 34 is about 10 to 30% of the mainstream before splitting off the sidestream, i.e., 10 to 30% of the combined total of the sidestream and the mainstream after splitting. The mainstream 33 then travels to full flow carbon filter bed 35 in which it is contacted with carbon and from there through pipe 36 to the top of stripper 37 down which it progresses giving up acid gas as it descends. The temperature of the mainstream 36 before it enters the stripper 37 is about 90° C. The temperature of solution in the base of the stripper 37 is about 105° C. The lean aqueous DEA solution at the bottom of the stripper 37 is returned via pump 38 to the top of absorber 25. The pressure in the stripper is about 8 psig. p Cooled acid gas from the top of the stripper 37 (having a temperature of about 40° C.) is recycled through pipe 39 to the bottom of an acidifier 40 through a pump 41. Sidestream 34 is sent to the top of the acidifier 40 in which it travels downwardly contacting the acid gas entering the bottom through line 39. The acid gas renders the sidestream more acid and the pH drops to about 7.5 to about 8. The gas passing out of the top of acidifier 40 is moved through pipe 42 to vent. The temperature at the bottom of acidifier 40 is about 50° C., at the top it is about 40° C. and the pressure in the acidifier is about 100 psig. The sidestream of lowered pH is removed from the bottom of acidifier 40 and sent through line 43 to decanter 44 in which heavy insoluble polymer and light insoluble hydrocarbons are removed. The heavy insoluble polymer is removed from the decanter 44 through pipe 45 and light insoluble hydrocarbons are decanted off through a vent line (not shown). From the decanter 44 the acidified sidestream passes through pipe 46 to a carbon bed 47. After passing through the carbon bed 47 the acidified sidestream passes through pipe 48 and rejoins the mainstream flowing into the mainstream carbon bed 35 from whence it passes through line 36 into the top of stripper 37. Stream 28 from the bottom of stripper 37 passes through a heat exchanger (not shown) as does stream 32 so that heat from stream 28 is transferred to stream 32. If polymer is allowed to build up in the system it plates out on heat exchange surfaces to foul same and render the heat exchanger less effective or ineffective.

The feed gas used in Examples 5–7, G and H typically contains the gases disclosed in Table IV and, in each case, is fed to the absorber 25 at the rate of 28 liters per minute.

TABLE IV
FEED GAS ANALYSIS

|  | Wt. % |
|---|---|
| Oxygen | 0.41 |
| Carbon monoxide | 5.25 |
| Nitrogen | 0.37 |
| Water | 0.25 |
| Hydrogen | 2.03 |
| Methane | 8.64 |
| Ethane | 1.31 |
| Ethylene | 26.75 |
| Acetylene | 5.35 |
| Propane and propylene | 4.45 |
| Methylacetylene and propadiene | 1.78 |
| Butadiene | 2.78 |
| Butene | 0.16 |
| Vinylacetylene | 0.68 |
| Diacetylene | 0.001 |
| Cyclopentadiene, isoprene, dripolene | 0.61 |
| Benzene | 0.67 |
| Toluene | 0.1 |
| $H_2S$ | 0.33 |
| $CO_2$ | 39.63 |

Example G

In Example G, the system shown in FIG. 2 is used without using sidestream 34, acidifier 40, decanter 44, carbon beds 35 and 47, pump 41, and lines 42, 43, 46 and 48. The full effluent stream from the bottom of the absorber 25 is sent through decanter 30 and lines 29, 32, 33 and 36 directly to the top of stripper 37. The amount of aqueous DEA in the sysrem is about 7 liters and the circulation rate amounts to about 10 liters per hour. The acid gas loading in the DEA solution passing into the stripper is about 0.5 mol acid gas per mol of DEA. Gardner color values, polymer content and other characteristics of the lean aqueous absorbent solution in line 28 are given in Table V below. The pH of the rich aqueous absorbent solution traveling in line 29 (32) is slightly less than the value given in Table V in each case because of its acid gas content but is well above 8.

TABLE V

| Day Number | Solution Gardner Color | Polymer* Content mg/g | % Sulfur in Polymer | Specific Gravity 20° C | Viscosity Centipoise 20° C | pH** | Wt. % DEA |
|---|---|---|---|---|---|---|---|
| 1 | 18+ | 0.853 | 52.1 | 1.065 | 5.28 | 10.01 | 33.81 |
| 2 | 18+ | 2.14 | 27.0 | 1.068 | 6.38 | 10.02 | 36.73 |
| 3 | 18+ | 2.48 | 57.6 | 1.069 | 6.95 | 9.97 | 37.97 |
| 4 | 18+ | 1.36 | 46.9 | 1.072 | 7.33 | 10.22 | 38.72 |
| 5 | 18+ | 2.89 | 44.6 | 1.077 | 8.30 | 9.68 | 39.69 |
| 6 | 18+ | 2.09 | 45.5 | 1.079 | 8.19 | 9.73 | 39.32 |
| 7 | 18+ | 2.22 | 5.29 | 1.072 | 7.14 | 9.72 | 37.42 |
| 8 | 18+ | 2.45 | 45.9 | 1.080 | 8.23 | 9.70 | 39.23 |
| 9 | 18+ | 2.81 | 95.6 | 1.082 | 9.52 | 9.24 | 41.54 |
| 10 | 18+ | 2.96 | 51.5 | 1.084 | 9.95 | 9.25 | 40.87 |
| 11 | 18+ | 2.73 | 17.2 | 1.081 | 8.59 | 9.14 | 39.07 |
| 12 | 18+ | 3.03 | 52.3 | 1.081 | 8.83 | 9.14 | 39.49 |

TABLE V-continued

| Day Number | Solution Gardner Color | Polymer* Content mg/g | % Sulfur in Polymer | Specific Gravity 20° C | Viscosity Centipoise 20° C | pH** | Wt. % DEA |
|---|---|---|---|---|---|---|---|
| 13 | 18+ | 3.43 | 56.6 | 1.085 | 8.61 | 9.08 | 38.74 |

*Polymer in solution (not precipitated) in milligrams of polymer per gram of aqueous DEA solution.
After stripping off acid gas in the stripper 37**.

It is noted that the polymer content continually increases and the point is ultimately reached at which the polymer begins to foul the process equipment, especially heat exchangers.

Example H

In Example H, the system shown in FIG. 2 is used without sidestream 34, acidifier 40, decanter 44, carbon bed 47, pump 41, and lines 42, 43, 46 and 48. In this Example full flow carbon bed 35 is used, however. The full effluent stream from the bottom of absorber 25 is sent through decanter 30 and lines 29, 32 and 33 to full flow carbon bed 35 and thence through line 36 to the top of stripper 37. The amount of aqueous absorbent solution in the system is about 7.5 liters and the circulation rate amounts to about 12 liters per hour. The acid gas loading in the DEA solution passing into the full flow carbon bed is about 0.5 mol acid gas per mol of DEA. After about 200 hours of operation the full flow carbon bed 35 became plugged and was thereafter replaced with a fresh carbon bed. Gardner color values, polymer content and other characteristics of the lean aqueous DEA solution are given in Table VI below. The pH of the rich aqueous DEA solution traveling in line 29 (32) is slightly less than the value given in Table VI in each case because of its acid gas content but is well above 8.

TABLE VI

| Day Number | Solution Gardner Color | Polymer* Content mg/g | % Sulfur in Polymer | Specific Gravity 20° C | Viscosity Centipoise 20° C | pH** | Wt. % DEA |
|---|---|---|---|---|---|---|---|
| 1 | 10.5 | 0.038 | — | 1.063 | 5.31 | 9.15 | 35.28 |
| 2 | 11.5 | — | — | 1.064 | 5.56 | 9.17 | 35.85 |
| 3 | 11.5 | 0.067 | — | 1.069 | 5.90 | 9.12 | 36.36 |
| 4 | 11.5 | 0.27 | 37.4 | 1.073 | 6.77 | 9.08 | 38.16 |
| 5 | 13.0 | 0.477 | 47.8 | 1.093 | 8.60 | 8.89 | 40.14 |
| 6 | 13.0 | 0.518 | 53.4 | 1.083 | 7.60 | 8.94 | 38.96 |
| 7 | 13.5 | 0.545 | 54.2 | 1.086 | 8.25 | 9.04 | 40.02 |
| 8 | 14.5 | 0.789 | 45.8 | 1.079 | 7.97 | 9.42 | 39.88 |
| 9 | 15.0 | 1.099 | 45.6 | 1.08 | 7.88 | 9.58 | 39.18 |
| 10 | 15.0 | 1.107 | 64.7 | 1.086 | 8.80 | 9.44 | 40.21 |
| 13 | — | 3.086 | 25.0 | 1.122 | 6.42 | 8.45 | 32.43 |
| 14 | — | 3.051 | 23.4 | 1.100 | 7.39 | 8.62 | 35.64 |
| 15 | — | 0.778 | 30.0 | 1.100 | 7.63 | 8.75 | 36.84 |
| 16 | — | 0.396 | 41.2 | — | — | — | — |
| 17 | 14.0 | 0.665 | — | 1.086 | 8.71 | 9.17 | 40.42 |
| 18 | 13.5 | 0.740 | — | 1.083 | 9.28 | 9.28 | 41.54 |
| 19 | 14.0 | 0.430 | — | 1.082 | 8.27 | 9.21 | 39.69 |
| 20 | 14.0 | 0.490 | — | 1.082 | 7.76 | 9.20 | 38.63 |
| 25 | 14.5 | 0.636 | 55.0 | 1.086 | 7.71 | 9.02 | 38.03 |
| 26 | 14.5 | 1.013 | 51.8 | 1.088 | 8.52 | 8.98 | 39.63 |
| 27 | 13.5 | 0.777 | 62.0 | 1.090 | 8.13 | 8.94 | 38.72 |
| 28 | 14.5 | 1.23 | 44.2 | 1.093 | 9.88 | 8.93 | 41.21 |
| 29 | 14.0 | 0.988 | 68.3 | 1.098 | 10.68 | 8.97 | 41.48 |
| 30 | 14.5 | 1.205 | 53.4 | 1.082 | 6.89 | 9.01 | 36.30 |
| 31 | 14.5 | 1.224 | — | 1.095 | 8.07 | 8.89 | 37.52 |
| 32 | 14.5 | 1.473 | 74.7 | 1.099 | 9.54 | 8.91 | 39.55 |
| 33 | 16.0 | 1.998 | 69.6 | 1.129 | 12.53 | 8.61 | 39.85 |
| 34 | 18+ | 2.206 | — | 1.095 | 8.80 | 8.91 | 38.39 |
| 35 | 18+ | 2.16 | 72.3 | 1.09 | 8.16 | 9.22 | 37.39 |
| 36 | 18+ | 2.50 | 75.0 | 1.091 | 7.59 | 8.85 | 36.00 |
| 37 | 18+ | 2.91 | 73.9 | 1.102 | 7.91 | 8.71 | 37.75 |

TABLE VI-continued poration of the acidified sidestream 48 into the mainstream ahead of the full flow carbon bed 35.

TABLE VII

| Day Number | Solution Gardner Color | Polymer Content mg/g[1] | % Sulfur in Polymer | Specific Gravity 20° C | Viscosity Centipoise 20° C | pH[2] | Wt. % DEA | Acid-Gas Loading Stripper[3] |
|---|---|---|---|---|---|---|---|---|
| 1 | 6.5 | — | — | 1.083 | 5.54 | 8.9 | 33.84 | 0.242 |
| 2 | 7.0 | 0.103 | — | 1.076 | 6.04 | 9.1 | 36.33 | 0.145 |
| 3 | 11.5 | 0.353 | — | 1.079 | 7.06 | 9.08 | 38.79 | 0.152 |
| 4 | 11.5 | 0.365 | — | 1.096 | 8.04 | 8.86 | 38.33 | 0.232 |
| 5 | 12.5 | 0.414 | — | 1.095 | 8.18 | 8.98 | 39.26 | 0.224 |
| 6 | 13.0 | 0.598 | — | 1.094 | 7.69 | 8.89 | 38.73 | 0.241 |
| 7 | 13.0 | 0.313 | — | 1.085 | 7.03 | 9.01 | 38.35 | 0.208 |
| 8 | 13.5 | 0.499 | — | 1.082 | 8.68 | 9.22 | 41.23 | 0.174 |
| 9 | 15.5 | 0.844 | — | 1.092 | 10.48 | 8.99 | 42.51 | 0.184 |
| 10 | 15.5 | 0.518 | 74.6 | 1.112 | 12.47 | 8.82 | 42.86 | 0.278 |
| 11 | 13.0 | 0.966 | 82.4 | 1.102 | 10.04 | 8.89 | 41.24 | 0.242 |
| 12 | 13.0 | 0.920 | 84.6 | 1.099 | 8.74 | 8.87 | 39.02 | 0.254 |
| 13 | 13.5 | 1.397 | 79.1 | 1.097 | 8.41 | 8.87 | 38.14 | 0.262 |
| 14 | 14.5 | 1.290 | 68.9 | 1.100 | 8.98 | 8.90 | 39.12 | 0.262 |
| 15 | 13.5 | 0.948 | 53.8 | 1.077 | 4.73 | 8.97 | 31.34 | 0.230 |
| 16 | 11.5 | 0.270 | — | 1.057 | 3.33 | 8.95 | 26.28 | 0.195 |
| 17 | 12.5 | 0.464 | — | 1.062 | 3.43 | 8.80 | 26.16 | — |
| 18 | 12.5 | 0.427 | — | 1.061 | 3.51 | 8.97 | 26.67 | — |
| 19 | 13.0 | 0.459 | — | 1.060 | 3.83 | 9.07 | 28.48 | — |
| 20 | 13.5 | 0.419 | — | 1.078 | 4.94 | 8.90 | 31.74 | — |
| 21 | 13.5 | 0.780 | 56.5 | 1.090 | 5.84 | 8.85 | 33.72 | — |
| 22 | 14.5 | 0.779 | — | 1.083 | 6.67 | 9.0 | 36.51 | — |
| 23 | 15.0 | 0.864 | 75.1 | 1.090 | 7.80 | 8.91 | 38.41 | — |
| 24 | 15.5 | 1.027 | 74.6 | 1.099 | 7.94 | 9.92 | 38.79 | — |
| 25 | 16.5 | 1.149 | 69.2 | 1.088 | 7.71 | 9.83 | 38.42 | — |
| 26 | 17.5 | 1.068 | 71.0 | 1.087 | 6.84 | 9.73 | 37.64 | — |
| 27 | 18 | 1.333 | 67.2 | 1.095 | 8.58 | 9.60 | 38.98 | — |
| 28 | 16 | 1.112 | 71.5 | 1.102 | 8.81 | 9.68 | 38.47 | — |
| 29 | 16 | 1.389 | 77.8 | 1.088 | 7.88 | 9.79 | 38.25 | — |
| 30 | 16 | 0.817 | 70.0 | 1.100 | 6.59 | 9.48 | 34.38 | — |
| 31 | 16 | 0.991 | — | 1.073 | 6.61 | 9.93 | 36.96 | — |
| 32 | — | 0.991 | — | 1.084 | 7.31 | 9.81 | 37.62 | — |

[1]Polymer in solution (not precipitated) in milligrams of polymer per gram of aqueous DEA solution.
[2]After stripping off acid gas in stripper 37.
[3]Of aqueous DEA solution at bottom of stripper 37.

| Day Number | Solution Gardner Color | Polymer* Content mg/g | % Sulfur in Polymer | Specific Gravity 20° C | Viscosity Centipoise 20° C | pH** | Wt. % DEA |
|---|---|---|---|---|---|---|---|
| 38 | 18+ | 1.63 | 55.6 | 1.106 | 8.44 | 8.80 | 36.40 |

*Polymer in solution (not precipitated) in milligrams of polymer per gram of aqueous DEA solution.
**After stripping off acid gas in stripper 37.

It is noted from Table VI that for short periods of time the polymer content appears to be under control. However, the polymer content increases. These increases apparently result from the breaking through the carbon bed of polymer and/or the polymerizable component, e.g., dripolene fractions and other olefinically unsaturated compounds. Even so, a generally increased trend of higher polymer content appears in the results of Table VI and along with the periodic plugging endangers the process equipment to fouling.

Example 5

In this example, the full system as shown in FIG. 2 is used with all equipment as shown. The amount of aqueous DEA solution in the system is about 8 liters and the circulation rate amounts to about 12 liters per hour. The sidestream 34 comprises about 10% of the full mainstream, i.e., about 10% of the stream traveling through line 32, and about 10% of the acid gas removed from the top of stripper 37 is circulated to the acidifier 40. The acid gas loading in the DEA solution entering full flow carbon bed 35 is about 0.55 mol acid gas per mol of DEA. Gardner color values, polymer content and other characteristics are given in Table VII below. The pH of the rich aqueous DEA solution flowing into the full flow carbon bed 35 is about 8 or below because of incorporation of the acidified sidestream 48 into the mainstream ahead of the full flow carbon bed 35.

As noted from the polymer content values given in Table VII, the polymer content of the DEA solution is kept below 1.5 mg polymer per gm aqueous DEA solution which is a substantial improvement over Examples G and H. Also, the full flow carbon bed 35 did not become plugged as it did in Example H. Furthermore, while neither carbon bed 35 nor 47 is able to completely remove the polymer in the DEA solution, the process according to Example 5 is capable of maintaining a 67 percent polymer removal rate twice as long as the process according to Example H. Removing polymer in the sidestream 34, 43, 46, 48, by using the acidifier 40, decanter 44 and carbon bed 47, reduced the load on the full flow carbon bed through 300 hours of operation. After 300 hours of operation, the DEA solution contained roughly the same level of polymer attained in only 200 hours of operation in Example H.

Example 6

In this Example, the full system as shown in FIG. 2 is used with all equipment as shown. In this case an aqueous MEA solution is used in an amount of about 8 liters in the system. The circulation rate of the solution is about 7 to about 8 liters per hour. The sidestream 34 comprises about 15% of the full mainstream, i.e., about 15% of the stream traveling through line 32, and about 15% of the acid gas removed from the top of stripper 37 is circulated to the acidifier 40. The acid gas loading in the MEA solution entering the full flow carbon bed 35 is about 0.6 mol acid gas per mol of MEA. Gardner color values, polymer contents and other characteristics of the system are given in Table VIII below. The pH of the rich aqueous MEA solution flowing into the full flow carbon bed 35 is well below 8 and close to about 7.5 because of incorporation of the acidified sidestream 48 into the mainstream ahead of the full flow carbon bed 35.

aqueous DEA solution flowing into the full flow carbon bed 35 is well below 8 and close to about 7.5 because of

TABLE VIII

| Day Number | Solution Gardner Color | Polymer Content mg/g[1] | Specific Gravity 20° C | Viscosity Centipoise 20° C | pH[2] | Wt. % MEA | Acid-Gas Loading Stripper[3] |
|---|---|---|---|---|---|---|---|
| 1 | — | 0.009 | 1.012 | 2.01 | 10.55 | 19.05 | 0.075 |
| 2 | 3 | 0.030 | 1.044 | 2.14 | 10.25 | 16.82 | 0.266 |
| 3 | 2-3 | 0.060 | 1.056 | 2.21 | 10.10 | 17.00 | 0.319 |
| 4 | 3 | 0.130 | 1.054 | 2.24 | 10.00 | 17.77 | 0.308 |
| 5 | 4.5 | 0.070 | 1.033 | 2.10 | 10.35 | 17.95 | 0.172 |
| 6 | 5.5 | 0.110 | 1.038 | — | 10.40 | 19.75 | 0.186 |
| 7 | 7.0 | 0.121 | 1.055 | — | 10.20 | 20.10 | 0.283 |
| 8 | 7.0 | 0.091 | 1.053 | — | 10.25 | 20.82 | 0.265 |
| 9 | 7.0 | 0.086 | 1.057 | — | 10.15 | 21.72 | 0.269 |
| 10 | 10.5 | 0.250 | 1.047 | — | 10.40 | 22.87 | 0.194 |
| 11 | 10.5 | 0.187 | 1.074 | — | 10.15 | 23.13 | 0.326 |
| 12 | 10.5 | 0.673 | 1.038 | — | 10.60 | 24.00 | 0.164 |
| 13 | 10.5 | 0.395 | 1.037 | — | 10.70 | 22.79 | 0.146 |
| 14 | 10.0 | 0.567 | 1.084 | — | 9.65 | 20.08 | 0.445 |
| 15 | 11.0 | 0.393 | 1.064 | — | 10.10 | 20.70 | 0.34 |
| 16 | 12.0 | 0.515 | 1.075 | — | 10.05 | 21.10 | 0.365 |

[1]Polymer in solution (not precipitated) in milligrams polymer per gram of aqueous MEA solution.
[2]After stripping off acid gas in stripper 37.
[3]Of aqueous MEA solution at bottom of stripper 37.

The circulating MEA solution remains extremely clear for 10 days and its Gardner color remains at 12 or below incorporation of acid gas into the solution by the acidifier 40.

TABLE IX

| Day Number | Solution Gardner Color | Polymer Content mg/g[1] | Specific Gravity 20° C | Viscosity Centipoise 20° C | pH[2] | Wt. % DEA | Acid-Gas Loading Stripper[3] |
|---|---|---|---|---|---|---|---|
| 1 | 6.5 | Nil | 1.063 | 4.67 | 9.60 | 32.37 | 0.124 |
| 2 | 11.5 | 0.40 | 1.066 | 4.77 | 9.68 | 32.34 | 0.161 |
| 3 | 12.0 | 0.70 | 1.073 | 4.99 | 9.45 | 33.04 | 0.193 |
| 4 | 13.5 | 0.58 | 1.084 | 5.29 | 9.40 | 33.36 | 0.219 |
| 5 | 14.0 | 0.55 | 1.076 | 5.34 | 9.35 | 33.90 | 0.187 |
| 6 | 14.5 | 0.51 | 1.075 | 5.52 | 9.58 | 34.87 | 0.170 |
| 12 | 14.5 | 0.26 | 1.064 | 5.42 | 9.75 | 34.93 | 0.126 |
| 13 | 14.0 | 0.41 | 1.067 | 5.77 | 9.80 | 36.20 | 0.103 |
| 14 | 13.5 | 0.284 | 1.076 | 6.04 | 9.52 | 36.34 | 0.166 |
| 15 | 13.5 | 0.364 | 1.076 | 6.40 | 9.65 | 37.53 | 0.147 |
| 16 | 13.0 | 0.463 | 1.084 | 6.87 | 9.60 | 37.73 | 0.201 |
| 17 | 13.0 | 0.537 | 1.101 | 8.34 | 9.35 | 39.23 | 0.254 |
| 18 | 13.5 | 0.716 | 1.075 | 6.24 | 9.40 | 37.14 | 0.221 |
| 19 | 12.5 | 0.566 | 1.074 | 6.17 | 9.58 | 37.75 | 0.156 |
| 20 | 13.5 | 0.579 | 1.082 | 6.64 | 9.62 | 36.82 | 0.217 |

[1]Polymer in solution (not precipitated) in milligrams polymer per gram of aqueous DEA solution.
[2]After stripping off acid gas in stripper 37.
[3]Of aqueous DEA solution at bottom of stripper 37.

over the entire run. This Example demonstrates that the higher acid gas loading (lower pH) of the aqueous MEA solution entering the full flow carbon bed 35 improves the carbon's ability to remove polymer from the solution. The lower amount of MEA in the solution also appears to assist in improving the carbon's ability to remove polymer. As the full flow carbon bed 35 approached saturation the polymer content in the MEA solution began to edge upwardly. No plugging of the carbon beds 35 or 47 was experienced. This Example demonstrates the ability of the present invention to completely remove polymer from the aqueous MEA solution.

Example 7

This Example is performed in the same manner as that described in Example 6 wherein, however, an aqueous DEA solution is used in the amount of about 8 liters at a circulation rate of about 7 to about 8 liters per hour. The sidestream 34 comprises about 15% of the full mainstream flowing through line 32, and about 15% of the acid gas removed from the top of the stripper 37 is recycled through acidifier 40. The acid gas loading in the DEA solution entering the carbon bed 35 is about 0.6 mol acid gas per mol of DEA. Gardner color values, polymer contents and other characteristics of the system are given in Table IX below. The pH of the rich As a result of incomplete cleaning of the system after Example 6 polymer builds up fairly rapidly in the first 2 or 3 days. Thereafter the polymer content decreases somewhat illustrating that the system is removing all polymer as it is formed. This Example demonstrates that the higher acid gas loading (lower pH) of the aqueous DEA solution entering the full flow carbon bed 35 improves the carbon's ability to remove polymer from solution as it is formed. No plugging occurred in the carbon beds 35 or 47.

Example 8

In this Example, the full system shown in FIG. 2 is used with all the apparatus as shown. The amount of aqueous DEA solution in the system is about 11 liters and the circulation rate is about 8.5 liters per hour. A feed gas having an analysis shown in Table I (containing about 15 vol. % $CO_2$ and about 0.3 vol. % $H_2S$) is fed into absorber 25 at the rate of 35.27 liters per minute at a temperature of 30° C. The height of absorber 25 is 10 feet and contains 9 feet of stainless steel ¼ inch protruded packing. It is operated at a pressure of 300 psig and a temperature of about 30° C. at the top and 60° C. at the bottom. Feed gas depleted of acid gas and containing 1.5 vol. % $CO_2$ and 0.008 vol. % $H_2S$ exits from absorber 25 through pipe 27 at the rate of 30.15 liters per minute. The decanter 30 is operated at a pressure of 160 psig and the temperature of DEA solution passing through it is approximately 25° C. The vent gas from the decanter contains 20 vol. % $CO_2$, 0.3 vol. % $H_2S$ and the balance other gases including hydrocarbons. The decanter vent gas flows at the rate of less than 1 liter per minute and is sent back through the absorber 25. Dripolene condensate is removed in the decanter 30 at the rate of 200 cc per hour. The stripper 37 is operated at 10 psig and a temperature of about 95° C. at the top and about 110° C. at the bottom. The acid gas is removed from the top of stripper 37 at the rate of 6.7 liters per minute and contains about 97 vol. % $CO_2$, about 1.7 vol. % $H_2S$ and about 1.3 vol. % hydrocarbons. The sidestream 34 to the acidifier 40 flows at the rate of 1 liter per hour, or about 11.8% of the full mainstream 32. The acid gas loading target in the DEA solution entering carbon bed 35 is about 0.7 mol acid gas per mol of DEA and its pH is below about 7.5, preferably 7.0 to 7.5. The Gardner color values, DEA content in the rich aqueous DEA solution passing through line 32 and the lean aqueous DEA solution passing through line 28, and the acid gas loadings of said rich and lean aqueous DEA solutions at specified points in time of the run are respectively given in Table X below.

TABLE X

| Time, Hr. | Gardner Color | DEA[1] Rich | DEA[1] Lean | Loading[2] Rich | Loading[2] Lean |
|---|---|---|---|---|---|
| 0 | 3 | — | 31 | 0 | 0 |
| 3 | — | — | — | 0.42 | — |
| 4.5 | — | — | — | 0.5 | — |
| 16.0 | 5.5 | — | 31.8 | — | — |
| 21.0 | — | 29.66 | — | 0.606 | — |
| 38.0 | 7.0 | 30.02 | 32.6 | 0.632 | 0.105 |
| 44.5 | — | 29.91 | — | 0.662 | — |
| 62 | 7.5 | 30.12 | 33.74 | 0.657 | 0.038 |
| 86 | 8.5 | 30.66 | 33.89 | 0.656 | 0.092 |
| 110 | 8.5 | 31.01 | 34.23 | 0.698 | 0.100 |
| 134 | 9.0 | 31.58 | 34.34 | 0.697 | 0.126 |
| 158 | 9.5 | 31.96 | 34.65 | 0.678 | 0.146 |
| 182 | 10.5 | 31.88 | 34.57 | 0.644 | 0.117 |
| 203 | 12.5 | 32.66 | 34.83 | 0.523 | 0.119 |
| 204 | 11.0 | — | — | — | — |
| 207.5 | — | 32.31 | — | 0.602 | — |
| 224.5 | 11.0 | 31.64 | 34.37 | 0.706 | 0.116 |
| 247 | 11.5 | 32.37 | 35.41 | 0.564 | 0.122 |
| 251 | — | 31.07 | — | 0.723 | — |
| 273.5 | 11.5 | 31.28 | 34.17 | 0.696 | 0.137 |
| 296.5 | 11.5 | 32.53 | 34.27 | 0.692 | 0.134 |
| 320 | 11.5 | 32.14 | 37.74 | 0.716 | 0.133 |

[1]Wt. % of DEA in rich and lean aqueous DEA solutions in lines 32 and 28, respectively.
[2]Acid gas loading in mol acid gas per mol of DEA in rich and lean aqueous DEA solutions in lines 32 and 28, respectively.

These results illustrate the effect of high acid gas loadings of about 0.7 in the rich aqueous DEA solution, consequently a pH below about 7.5, entering carbon bed 35 is keeping the system essentially polymer free throughout the entire run.

Example 9

Figure 3:
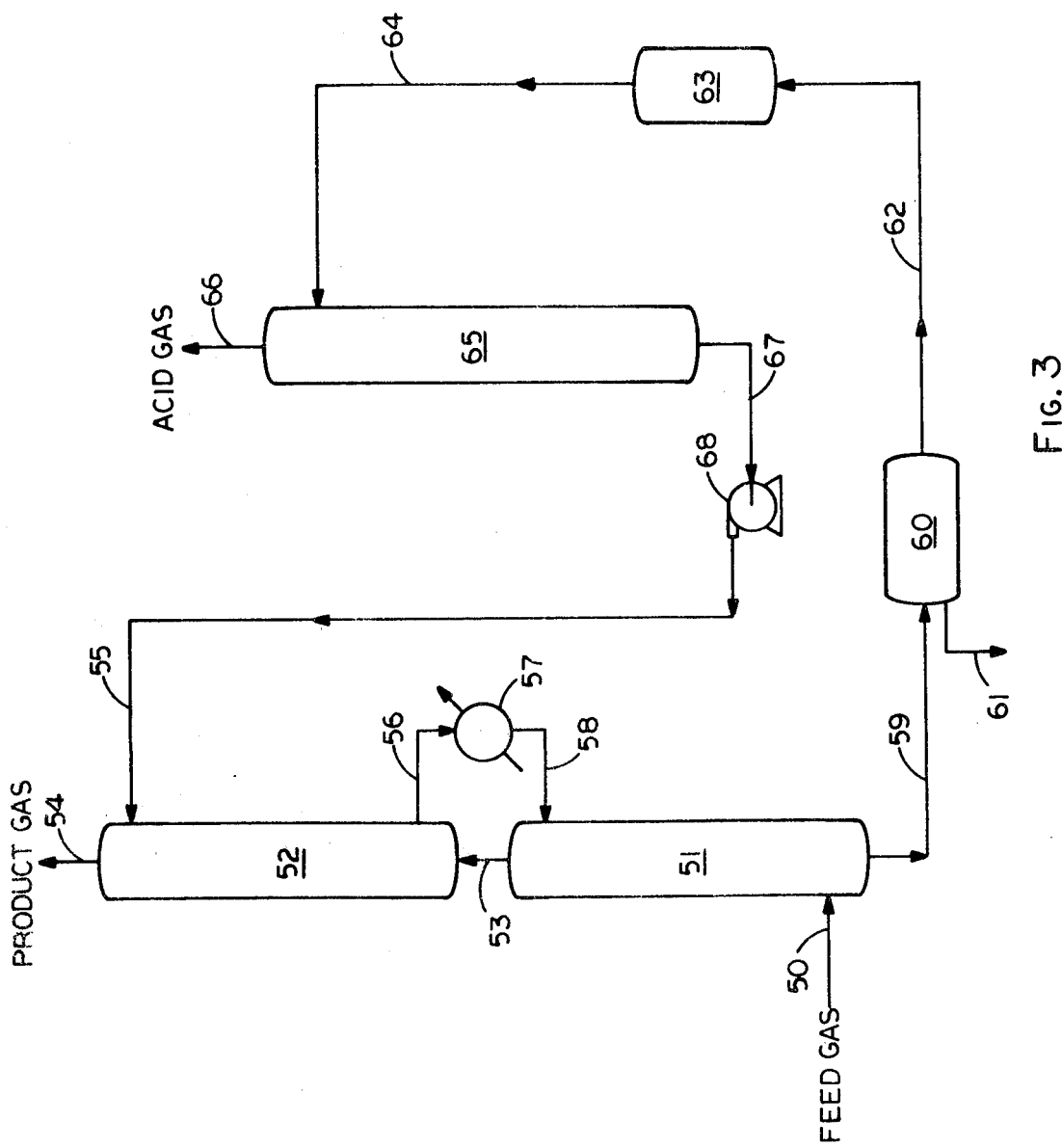
FIG. 3 is a flow diagram illustrating another embodiment of the invention wherein high acid gas loadings and lower pH's are provided by the acid gas content of the feed gas.

The system shown in FIG. 3 is used for this Example which illustrates the embodiment of this invention in which the acidifying circuit, i.e., acidifier 40, sidestream decanter 44, sidestream carbon bed 47 and associated pump 41 and piping 34, 42, 43, 46 and 48, is eliminated. In this Example, the increased acid gas loading and reduced pH of the aqueous absorbent solution entering the carbon filter is supplied by the feed gas by employing a two stage absorber and operating it in such fashion as to produce an acid gas loading in the aqueous absorbent solution of 0.6 or more and specifically 0.7 mol of acid gas per mol of absorbent, e.g., DEA.

As shown in FIG. 3 the feed gas (Table I) at a temperature of 40° C. is fed through pipe 50 into the first stage 51 of an absorber, flows upwardly therein and thence into the second stage 52 of the absorber through line 53. The feed gas depleted or free of acid gas exits the second stage 52 at a temperature of 40° C. through line 54. Lean aqueous DEA solution containing about 30 wt. % DEA and little or no acid gas and having a temperature of 40° C. is introduced into the top of the second stage 52 through line 55 and flows downwardly through the second stage 52. At the bottom thereof the aqueous DEA solution is taken out through line 56 and passed through a cooler 57 which drops its temperature from 70° C. down to about 40° C. The cooled DEA is returned through pipe 58 to the top of the first stage 51 down through which it passes and at the bottom of which it exits at a temperature of 50° C. through pipe 59 which transports it to decanter 60. The operating pressure of the absorber is about 300 psig. The rich aqueous DEA solution exiting first stage 51 through pipe 59 has an acid gas loading of about 0.7 mol acid gas per mol of DEA. The decanter 60 is under a pressure of about 100 psig and insoluble materials less dense than the DEA solution are decanted through a vent (not shown). Heavy insoluble polymers and other heavy materials separated in decanter 60 are removed through pipe 61. From decanter 60 the rich aqueous DEA solution is sent via line 62 to carbon filter bed 63 through which it passes and then flows (after passing through a heat exchanger [not shown]) at a temperature of about 90° C. through line 64 to stripper 65. It travels down through stripper 65 during which time acid gas is driven off and is vented from the stripper 65 through pipe 66. At the bottom of stripper 65, lean aqueous DEA solution is removed through line 67 and pumped via pump 68 to the top of the second stage 52 of the absorber. The temperatures in the top and bottom of stripper 65 are about 90° C. and about 110° C., respectively, and the pressure therein is about 5 psig. The rich aqueous absorbent stream 62 is heated in a heat exchanger (not shown) by the lean aqueous absorbent stream 67 exiting from the bottom of stripper 65.

The system shown in FIG. 3 as described above is capable of removing polymer in the aqueous DEA solution and keeping it clean and essentially polymer-free over long periods of time. It has the advantage of providing relative simplicity of construction and operation.

What is claimed is:

1. Process for removing polymer from regenerable acid gas-containing, aqueous absorbent solutions resulting from contact with organic gas-containing streams which contain acid gas and a polymerizable component forming said polymer under the conditions of contact and/or regeneration, comprising the steps of, (1) adjusting the pH of said acid gas-containing, aqueous absorbent solution to not more than about 8.5 and (2) removing said polymer from said acid gas-containing, aqueous absorbent solution having a pH of not more than about 8.5.

2. In a process for removing acid gas from hydrocarbon-containing feed gas containing it and a polymerizable component wherein (a) said feed gas is contacted in an absorbing zone with an aqueous absorbent solution containing as an absorbent an alkanolamine, an alkali metal carbonate, an alkali metal aminoalkanoate, ammonium carbonate or ammonium hydroxide to remove acid gas from said feed gas and form a mainstream of rich aqueous absorbent solution enriched in acid gas removed from the feed gas, (b) said rich aqueous absorbent solution is moved to a stripping zone where the acid gas contained therein is removed to form a lean aqueous absorbent solution depleted in acid gas content, and (c) said lean aqueous absorbent solution is recycled and re-contacted with succeeding feed gas containing acid gas and said polymerizable component, the improvement of removing polymer which accumulates in said aqueous absorbent solution due to the presence of said polymerizable component, comprising, (1) adjusting the pH of said rich aqueous absorbent solution into the range of about 6.0 to about 8.5 and (2) removing said polymer from said rich aqueous absorbent solution having a pH of about 6.0 to about 8.5.

3. Improvement as claimed in claim 2 wherein said absorbent solution after pH adjustment is filtered through carbon in step (2).

4. Improvement as claimed in claim 3 wherein said acid gas comprises $CO_2$ and $H_2S$ and said absorbent is an alkanolamine.

5. Improvement as claimed in claim 4 wherein said alkanolamine is diethanolamine.

6. Improvement as claimed in claim 4 wherein said alkanolamine is monoethanolamine.

7. Improvement as claimed in claim 4 wherein the pH of said solution is adjusted in step (1) to about 7 to about 7.5.

8. Improvement as claimed in claim 4 wherein said aqueous absorbent solution is passed through a decanter prior to filtration to enable heavy insoluble materials and light insoluble materials in said solution to be removed.

9. Improvement as claimed in claim 4 wherein step (1) is achieved by adding to said aqueous absorbent an acid or acid-forming material in an amount sufficient to achieve a pH of about 6.0 to about 8.5.

10. Improvement as claimed in claim 4 wherein step (1) is achieved by increasing the loading of acid gas in said absorbent to not less than about 0.6 mol of acid gas per mol of said absorbent.

11. Improvement as claimed in claim 10 wherein said loading is about 0.65 to about 0.75 mol of acid gas per mol of said absorbent.

12. Improvement as claimed in claim 11 wherein said feed gas is counter-currently contacted with aqueous absorbent solution in step (a) in a two stage absorber, wherein said solution is cooled after leaving a first stage and before entering a second stage.

13. Improvement as claimed in claim 9 wherein said acid or acid-forming material is a weak acid or weak acid-forming material incapable of reacting with said absorbent to form a thermally stable compound with said absorbent.

14. Improvement as claimed in claim 13 wherein said weak acid or weak acid-forming material used in step (1) is acid gas removed from the aqueous absorbent solution in the stripping zone and recycled to contact said rich aqueous absorbent solution moving from the absorbing zone to the stripping zone.

15. Improvement as claimed in claim 14 wherein a sidestream of the rich aqueous absorbent solution is separated from the mainstream thereof and contacted with said acid gas removed in the stripping zone and thereafter returned to said mainstream.

16. Improvement as claimed in claim 15 wherein said sidestream after contact with said acid gas is passed through a decanter to enable heavy insoluble materials and light insoluble materials to be removed.

17. Improvement as claimed in claim 15 wherein said sidestream after contact with said acid gas is passed through a carbon filter before being returned to said mainstream.

18. Improvement as claimed in claim 15 wherein said sidestream is not more than about 30 percent of said mainstream before separation of said sidestream.

19. Improvement as claimed in claim 15 wherein said sidestream is not more than about 20 percent of said mainstream before separation of said sidestream.

20. Improvement as claimed in claim 15 wherein said sidestream is not more than about 10 percent of said mainstream before separation of said sidestream.

21. Improvement as claimed in claim 15 wherein said sidestream is returned to said mainstream in the bottom of said absorbing zone.

22. Improvement as claimed in claim 15 wherein said sidestream is returned to the mainstream after it leaves said absorbing zone and before it contacts said carbon filter.

23. Improvement as claimed in claim 13 wherein said weak acid or weak acid-forming material is additional feed gas containing acid gas.

24. Improvement as claimed in claim 13 wherein said weak acid or weak acid-forming material is carbon dioxide.

25. Improvement as claimed in claim 13 wherein said weak acid or weak acid-forming material is hydrogen sulfide.

26. Improvement as claimed in claim 13 wherein said weak acid or weak acid-forming material is $CH_3SH$.

* * * * *

UNITED STATES PATENT OFFICE
CERTIFICATE OF CORRECTION

Patent No. 4,113,837  Dated September 12, 1978

Inventor(s) John Edward Kendall and Kenneth Francis Butwell

It is certified that error appears in the above-identified patent and that said Letters Patent are hereby corrected as shown below:

Column 1, line 65, for "sufaces" read -- surfaces --. Column 3, line 17, for "rick" read -- rich --. Column 9, line 20, for "plug" read -- plus --; line 65, for "-forths" read -- -fourths --. Column 12, line 47, before "Cooled" delete "p". Column 19, line 53, for "is" read -- in --.

Signed and Sealed this

Thirtieth Day of January 1979

[SEAL]

Attest:

RUTH C. MASON
Attesting Officer

DONALD W. BANNER
Commissioner of Patents and Trademarks